United States Patent [19]

Casper

[11] 4,214,738
[45] Jul. 29, 1980

[54] THREE-DIMENSIONAL ISOLATION MOUNT

[75] Inventor: Russell L. Casper, Loveland, Ohio

[73] Assignee: General Electric Company, Cincinnati, Ohio

[21] Appl. No.: 793,010

[22] Filed: May 2, 1977

[51] Int. Cl.² .............................................. F16F 15/02
[52] U.S. Cl. .................................. 267/141.1; 248/573
[58] Field of Search ................ 248/21, 258; 267/141.1

[56] References Cited

U.S. PATENT DOCUMENTS

| 2,502,322 | 3/1950 | Iredell .............................. 248/358 R |
| 2,687,269 | 8/1954 | Titus et al. . | |
| 2,867,434 | 1/1959 | Johnson . | |
| 3,052,435 | 9/1962 | Roller .................................... 248/21 |
| 3,073,557 | 1/1963 | Davis . | |
| 3,323,754 | 6/1967 | Johnson . | |

*Primary Examiner*—Robert I. Smith
*Attorney, Agent, or Firm*—Dana F. Bigelow; Derek P. Lawrence

[57] ABSTRACT

An isolation mount for damping radial vibration as well as axial vibrations without attendant shear forces to the elastomeric medium. A toroidal casing has a plate extending through its radially outer wall and terminating with flanges on its radially inner edge near a cylindrical core of the casing. Elastomeric O-rings are disposed on either side of the plate so as to be captured between the respective flange and oppositely disposed casing wall. Relative movement between the plate and the casing then results in compressive loads to certain portions of one or both of the O-rings, regardless of whether the relative motion is in the axial or radial direction.

17 Claims, 6 Drawing Figures

THREE-DIMENSIONAL ISOLATION MOUNT

The invention herein described was made in the course of or under a contract, or a subcontract thereunder, with the United States Department of the Air Force.

BACKGROUND OF THE INVENTION

This invention relates generally to dampers and, more particularly, to vibration mounts of the elastomeric type.

Resilient mounting means are often used to isolate or dampen the vibration of operating machinery from other associated parts of machinery. Such is the case in an aircraft engine apparatus wherein it is desirable, for example, to mount an oil tank on the engine which is susceptible to vibration and which without isolation will produce fatigue cracks in the sheet metal skin of the tank.

One means of isolating such vibrational movement is to fasten an elastomeric material between the vibrating element and the element which is mounted thereto. Such an arrangement will provide adequate damping when the two elements are moving relatively toward each other (axially), since the elastic material will be in compression. However, when the two elements are moving away from each other there will be no damping provided. Further, when the two elements are moving transversely to each other (radially), then there is a damping action, but it tends to create a shear force on the elastic material which in time will finally cut and tear the material and render it useless. Various methods have been devised to provide compressive elastomeric damping for either axial direction, but in all such devices there is no provision for preventing the shear forces which occur from the radial vibrations.

It is, therefore, an object of the present invention to provide an isolation mount which dampens relative movement in either the axial or radial directions.

Another object of the present invention is the provision for an isolation damper which is effective in damping radial forces without attendant shear forces being imposed on the elastomeric medium.

Yet another object of the present invention is the provision for an isolation mount which is effective in use and economical and practical in design.

Another objective of the present invention is to provide a mount which limits deflection in both the radial and axial directions.

These objects and other features and advantages become more readily apparent upon reference to the following description when taken in conjunction with the appended drawings.

Briefly, in accordance with one aspect of the invention, a toroidal casing which is adapted for attachment to an element for which damping is desired, is provided with a pair of axially spaced, elastomeric O-rings. A plate, which is attachable to the vibrating engine, extends radially inward through the casing wall and between the O-rings to a point surrounding but not touching the central core of the toroidal casing. The plate then flanges in opposite directions toward the ends of the toroidal casing to entrap the elastomeric O-rings between the flanges and the respective oppositely disposed casing walls. When the plate moves axially with respect to the casing, one of the two elastomeric O-rings is compressed between the plate and the casing end wall, while the other elastomeric O-ring is not affected. When the plate moves radially with respect to the casing, one side of each of the O-rings is compressed between the flanges and the radially outer walls of the casing, while the other half of the O-rings are not affected. In this way, the elastomeric O-rings are protected from shear forces which would otherwise tend to destroy them.

By another aspect of the present invention, the central core of the toroidal casing is of the predetermined length such that the O-rings are placed in a preloaded compression so as to establish positive connection between the casing and the plate.

By yet another aspect of the invention, the clearances between the flanges and the central core, and between the flanges and the casing end walls, are controlled to limit the mount deflections in the radial and axial directions, respectively. In the event of a mount overload, the plate flanges will come into contact with the casing and thereby limit further displacement to prevent overloading of the elastomer rings and prevent contact of the mounted part with adjacent objects.

In the drawings as hereinafter described, a preferred embodiment and modified embodiments are depicted; however, various other modifications and alternative constructions can be made thereto without departing from the true spirit and scope of the invention.

DESCRIPTION OF THE PREFERRED EMBODIMENT

Figure 1:
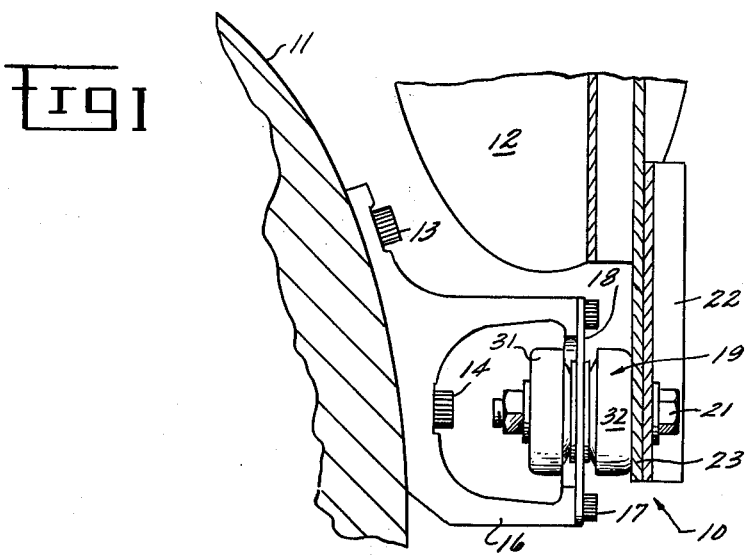
FIG. 1 is a partial longitudinal view of the isolation mount in the installed position in accordance with the preferred embodiment of the invention.

Referring now to FIG. 1, the invention is shown generally at 10 in the installed position intermediate the combustor casing 11 of an aircraft engine and a lube oil tank 12 supported thereby. Rigidly fastened to the combustor casing 11 by a pair of bolts 13 and 14 is a lower mount support 16 which has at its outer end a plurality of bolts 17 for rigidly securing the isolator plate 18 thereto. Since the combustor casing 11 in its normal operation is susceptible to both axial and radial (with respect to the core of the isolator) directed movements, these forces will be transmitted to the isolator plate 18 for damping by the elastomeric means within the isolator. Heretofore, effective damping was obtained in the axial direction, but in the radial direction, even though the forces were dampened, the shear forces which were created on the elastomeric material caused eventual failure. The present invention is designed to accommodate those radial vibrations without the creation of attendant shear forces.

The isolator plate 18 is resiliently connected to and forms a part of the isolator structure 19. Portions of the isolator 19 are rigidly connected to the lube oil tank 12 by way of a bolt 21, a bracket 22, and a flange 23 extending downwardly from the lube oil tank 12.

Figure 2:
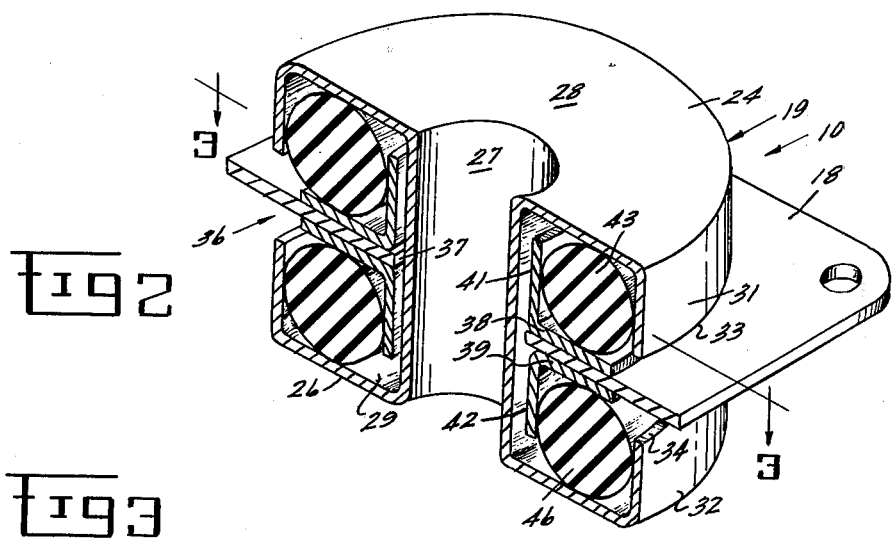
FIG. 2 is a perspective view of the mount in accordance with the preferred embodiment of the invention.
Figure 3:
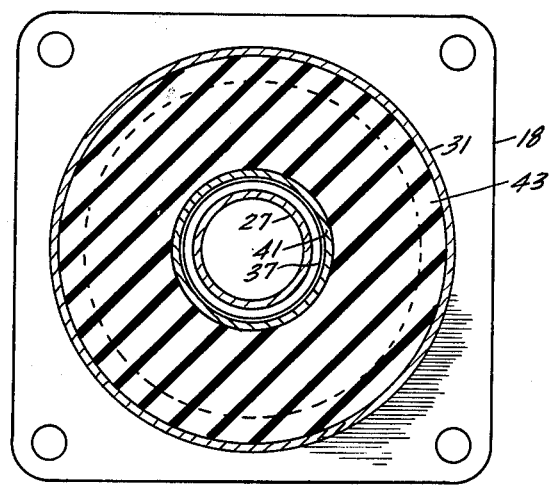
FIG. 3 is an end view thereof.

Referring now more specifically to the isolator itself as shown in FIGS. 2 and 3, that portion which is rigidly connected to the lube oil tank comprises a pair of axially spaced caps 24 and 26 interconnected by a central cylinder 27. The caps 24 and 26 have mutually parallel end walls 28 and 29 and cylindrical side walls 31 and 32, respectively, which terminate at opposed edges 33 and 34 to define an annular slot 36. Disposed in the slot 36 is the plate 18 in substantial alignment with the end walls 28 and 29, the inner edge 37 of the plate being spaced from the central cylinder 26 by a predetermined distance for reasons discussed hereinafter. Attached to the opposite sides of the plate 18, by welding or the like, are collars 38 and 39 which are L-shaped in cross section and which have flanges 41 and 42, respectively, extending parallel to but spaced from the central cylinder 27. Disposed between the collar 38 and the cap 24 is an elastomeric O-ring 43 which is held in place radially by the cylindrical side wall 31 and the flange 41, and axially by the end wall 28 and the collar 38. Similarly, an elastomeric O-ring 46 is captured between the cylindrical side wall 32, the flange 42, the end wall 29 and the collar 39.

The isolator 19 is constructed in such a manner that when in the free state, the elastomeric O-rings 43 and 46 are slightly compressed in both the axial and radial directions so as to provide a substantially tight connection between the plate 18 which is rigidly attached to the lower mount support 16, and the caps 24 and 26 which are rigidly attached to the lube oil tank 12 by the bolt 21 extending through the cylinder 27. When relative axial movement occurs between the plate 18 and the central cylinder 27, one of the elastomeric O-rings 43 or 46 is compressed while the other one is relaxed. If relative radial movement occurs between the two parts, a portion of the circumference of each of the O-rings is compressed while the remaining portion is unloaded. In neither case, nor in a combination of the two actions, do shearing forces act on either of the O-rings.

It will be recognized that during relative movement of the isolator parts in the radial direction, the flanges 41 and 42 move closer to the cylinder 27, and that during axial movement thereof, the edges of the flanges move toward one of the cap end walls 28 or 29. If the movement goes far enough, the parts will engage and further movement will be prevented. Thus, the free state spacing of these engageable parts may be predetermined and established so as to correlate with predetermined forces to thereby limit the amount of deflection in both the radial and axial directions and to limit the displacement of the relatively moving components when an overload occurs. Further, a total loss of mount integrity is prevented by the metal part contact in the event of failure of the elastomeric rings.

It should also be recognized that the spring rate and attenuation of the mount design can be varied as required by altering the cross-sectional shape of the O-rings, or stiffness of the elastomer material. Use of different cross section O-rings permits variation of the mount isolation characteristics for specific applications without the need for changes in other isolator parts.

Figure 4:
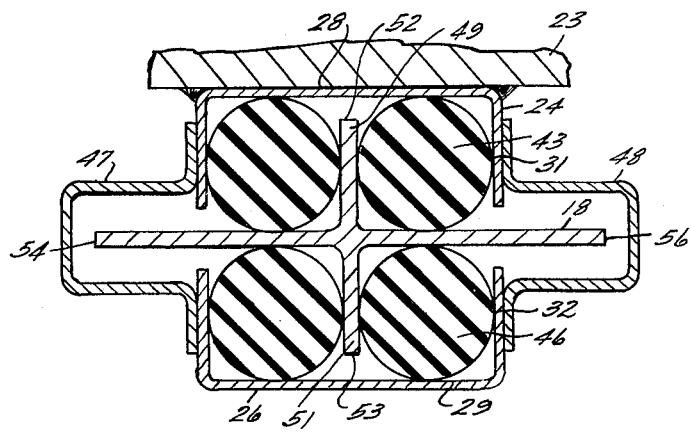
FIG. 4 is a sectional view of a modified embodiment of the present invention.
Figure 5:
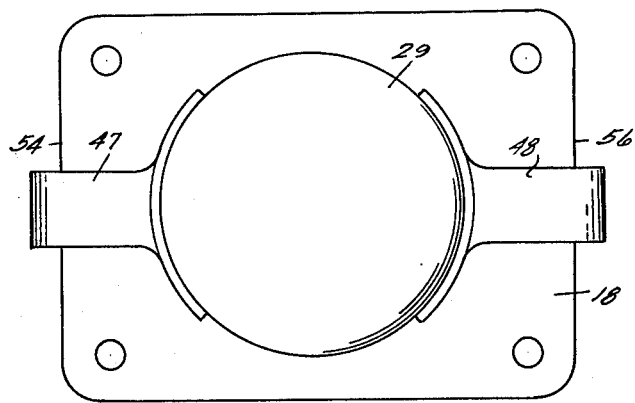
FIG. 5 is an end view thereof.

Referring now to the alternate embodiment of FIGS. 4 and 5, the end caps 24 and 26 are rigidly secured by a pair of U-brackets 47 and 48 which are secured to the caps 24 and 26 by welding or the like and extend around the plate 18. The integral unit may then be rigidly attached to the bracket 22 by securing the cap 24 to the flange 23 by welding or the like, or by attaching one or both of the U-brackets 47 or 48 to the flange 23. The flanges projecting from the isolator plate 18 then take the form of a pair of posts 49 and 51 or a pair of small cylinders located centrally with respect to the cylindrical side walls 31 and 32. The elastomeric O-rings 43 and 46 are then entrapped radially by the post 49 and side wall 31 on the one side and by the post 51 and side wall 32 on the other side, and axially by the end wall 28 and plate 18 on one side and the end wall 29 and plate 18 on the other side. Movement in the axial direction is limited by the eventual engagement of the post ends 52 or 53 with the end caps 28 and 29, respectively, and is similarly limited in the radial direction to some extent by the possible engagement of the plate edges 54 and 56 with the U-brackets 47 and 48, respectively. It will be recognized, however, that for the radial movement, restraint is only provided in the plane of the brackets 47 and 48, and if it is necessary to limit movement in other directions on this radial plane, then it will be necessary to extend the brackets 47 and 48 in an arcuate manner around the side walls 31 and 32. However, for predicted vibration in a single radial direction, the present design would be sufficient.

Figure 6:
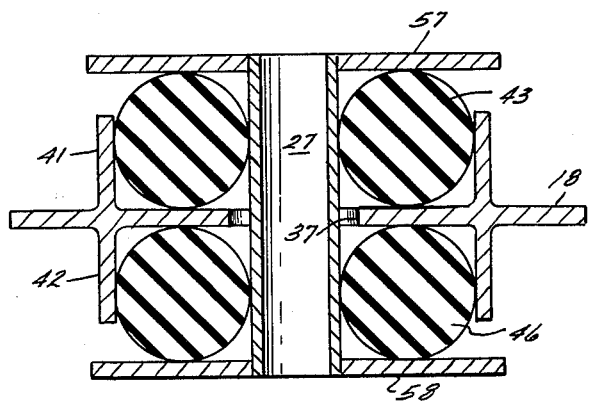
FIG. 6 is a sectional view of another modified embodiment of the present invention.

In the modified embodiment of FIG. 6, the modified caps 57 and 58 are securely attached by a central cylinder 27 and have no side walls. The flanges 41 and 42 projecting outwardly on either side of the plate 18 are spaced radially outward from the plate inner edge 37 to form the outer boundary of the elastomeric O-rings 43 and 46. The inner boundary therefore is provided by the cylindrical walls of the central cylinder 27. Movement in the axial and radial directions is limited in the same way as in the preferred embodiment.

It will be understood that while the present invention has been described in terms of a preferred and modified embodiments, it may take on any number of other forms while remaining within the scope and intent of the invention. For example, the mount has been described in terms of use for mounting an oil tank; however, such a mount may also be used to attach an aircraft engine to an aircraft. Further, it will be recognized that the types of construction may take on various other forms. For example, the plate and collar combination may be made by simply joining two plates each having annular collars extending from one side thereof.

Having thus described the invention, what is considered novel and desired to be secured by Letters Patent of the United States is:

1. An improved isolation mount of the type having first and second mount members connectible to respective elements susceptible to relative axial and radial vibration and having a damping means therebetween to dampen relative axial vibrations wherein the improvement comprises:

(a) a cylindrical wall extending axially from the first mount member and at least partially engaging throughout its circumference the damping means;

(b) a cylindrical wall extending axially from the second member and at least partially engaging throughout its circumference the damping means, said first mount member cylindrical wall and said second mount member cylindrical wall having said damping means disposed therebetween to dampen relative radial vibrations between the first and second mount means, and wherein said second mount member cylindrical wall limits relative axial movement between said first and second mount members to a predetermined degree.

2. An improved isolation mount of the type set forth in claim 1 wherein said first mount member cylindrical wall comprises a cylindrical core through which a mounting bolt can be inserted.

3. An improved isolation mount as set forth in claim 2 wherein said cylindrical wall extending from the first mount member surrounds said damping means.

4. An improved isolation mount as set forth in claim 1 wherein said first mount member cylindrical wall comprises an outer wall surrounding at least a portion of said damping means.

5. An improved isolation mount as set forth in claim 4 wherein said second mount member cylindrical wall comprises a cylindrical core through which a mounting bolt can be inserted.

6. An improved isolation mount as set forth in claim 1 wherein said first mount member comprises a pair of axially spaced caps interconnected by a cylindrical core spacer.

7. An improved isolation mount as set forth in claim 6 wherein the length of said spacer is such as to preload the damping means disposed between said caps.

8. An improved isolation mount of the type as set forth in claim 1 wherein said second mount member comprises a plate aligned in a radial plane.

9. An improved isolation mount as set forth in claim 8 and further wherein said second mount member cylindrical wall is attached proximate the radially inner edge of said plate.

10. An improved isolation mount as set forth in claim 8 and further wherein said second mount member is attached at a point radially outwardly from the inner edge of said plate.

11. An improved isolation mount as set forth in claim 1 wherein said damping means comprises a pair of axially spaced elastomeric O-rings having the second mount member disposed therebetween.

12. An isolation mount comprising:
(a) a pair of axially spaced rigidly connected caps having oppositely disposed end walls and outer, substantially cylindrical side walls;
(b) a plate extending between and parallel with said end caps and having a pair of cylindrical flanges extending oppositely toward respective said end walls;
(c) a pair of elastomeric O-rings each disposed between one of said end caps and one side of said plate, each of said O-rings being captured between one of said flanges and said outer, substantially cylindrical side wall to dampen relative movement therebetween; and
(d) stop means for limiting relative axial movement between said caps and said plate.

13. An isolation mount as set forth in claim 12 wherein said plate cylindrical flanges comprise said stop means.

14. An isolation mount as set forth in claim 12 wherein said caps are rigidly connected by a control cylinder and said O-rings are disposed in surrounding relationship therewith.

15. An isolation mount as set forth in claim 14 wherein said central cylinder comprises said side walls.

16. An isolation mount as set forth in claim 14 wherein the inner edges of said plate are spaced a predetermined distance from said central cylinder such that engagement occurs therebetween at a predetermined load threshhold.

17. An isolation mount comprising:
(a) a pair of axially spaced caps comprising end walls and cylindrical side walls, the caps being interconnected by a central cylinder and defining an annular cavity with an opening between mutually opposed edges of the cylindrical side walls;
(b) a plate aligned in a plane transverse to the axis of said central cylinder and extending into said opening, said plate having a pair of flanges oppositely extending toward the respective caps with said pair of flanges and said plate inner edge being radially spaced from said central cylinder; and
(c) a pair of elastomeric O-rings disposed in surrounding relationship with said central cylinder, one on either side of said plate, such that each one is captured between one of said flanges and one of said cylindrical side walls to dampen relative radial movement between said central cylinder and said plate.

* * * * *

UNITED STATES PATENT AND TRADEMARK OFFICE
CERTIFICATE OF CORRECTION

PATENT NO. : 4,214,738
DATED : July 29, 1980
INVENTOR(S) : Russell L Casper

It is certified that error appears in the above-identified patent and that said Letters Patent are hereby corrected as shown below:

IN THE CLAIMS:

Add a claim 18 as follows:

18. An improved isolation mount as set forth in claim 1 wherein said relative axial vibration is limited to a degree so as to present overloading of said damping means.

On the title page, after the abstract, "17 Claims" should read -- 18 Claims --.

Signed and Sealed this

Twenty-eighth Day of October 1980

[SEAL]

Attest:

SIDNEY A. DIAMOND

Attesting Officer

Commissioner of Patents and Trademarks